United States Patent

O'Callaghan

Patent Number: 6,056,068
Date of Patent: May 2, 2000

[54] WEED REMOVAL TOOL

[76] Inventor: Nicholas O'Callaghan, P.O. Box 391, Browns Plains, Australia, 4118

[21] Appl. No.: 09/228,497

[22] Filed: Jan. 11, 1999

[51] Int. Cl.$^7$ ...................................................... A01B 1/16
[52] U.S. Cl. ........................................... 172/378; 172/381
[58] Field of Search .................................... 172/378, 371, 172/381

[56] References Cited

U.S. PATENT DOCUMENTS

| | | | |
|---|---|---|---|
| 1,170,698 | 2/1916 | Stein | 172/378 |
| 2,373,898 | 4/1945 | Kulesh | 172/378 X |
| 3,061,270 | 10/1962 | Lowe | 172/378 X |
| 3,767,251 | 10/1973 | San Filipo | 172/378 X |
| 3,985,382 | 10/1976 | Wheeler | 172/378 X |
| 4,167,217 | 9/1979 | Tarantino | 172/378 X |
| 4,884,805 | 12/1989 | Patterson | 172/378 X |
| 4,951,951 | 8/1990 | Meyer | 172/378 X |
| 5,209,469 | 5/1993 | Laskowitz et al. | 172/378 X |
| 5,383,523 | 1/1995 | Stamp | 172/378 |
| 5,857,529 | 1/1999 | Nguyen | 172/378 |
| 5,871,058 | 2/1999 | Naccarato et al. | 172/378 |

FOREIGN PATENT DOCUMENTS

| | | | |
|---|---|---|---|
| 1378114 | 10/1964 | France | 172/378 |
| 2631511 | 11/1989 | France | 172/378 |
| 2647625 | 12/1990 | France | 172/378 |
| 226653 | 7/1943 | Switzerland | 172/378 |
| 459918 | 1/1937 | United Kingdom | 172/378 |
| 2216375 | 10/1989 | United Kingdom | 172/378 |

*Primary Examiner*—Christopher J. Novosad
*Attorney, Agent, or Firm*—Coats & Bennett, P.L.L.C.

[57] ABSTRACT

A gardening device comprising a weed engaging portion having forwardly projecting portions with a gap therebetween, a foot portion adapted to receive pressure applied by a foot, a base support having an arcuate lower surface and a handle portion connectable to an elongate handle; wherein pressure applied to the foot portion can be directed to move the weed engaging portion forward to engage a weed and a handle connected to the handle portion can be used to pivot the weed engaging portion upwardly with respect to the base to remove the weed from a ground surface.

24 Claims, 3 Drawing Sheets

WEED REMOVAL TOOL

The present invention relates to gardening implements which can be used for removing weeds.

A typical gardening implement for removing weeds consists of a fork with a short handle. The prongs of the fork are used to cut into the earth so that a weed can be located between these prongs. The weed can then be lifted using the handle and by shaking the dislodged weed earth that is lifted with the weed can be dislodged and fall back to the ground so that only the weed is left and it can then be removed.

A variation of the above implement is a trowel which has forwardly extending prongs which engage a weed therebetween when the trowel is moved forward. Earth is able to collect onto the shovel portion of the trowel and the weed is captured between the prongs. It can therefore be separated from the rest of the earth.

Both of the above described implements are hand held and hand driven. Such implements are preferable to gardening implements such as forks which can be pushed into the ground using a person's foot. This is because they are able to dislodge individual weeds with minimum disturbance to surrounding soil.

The present invention provides an alternative gardening device comprising a weed engaging portion having forwardly projecting portions with a gap therebetween, a foot portion adapted to receive pressure applied by a foot, a base support and a handle portion connectable to an elongate handle;

wherein pressure applied to the foot portion can be directed to move the weed engaging portion forward to engage a weed and a handle connected to the handle portion can be used to pivot the weed engaging portion upwardly with respect to the base support to remove the weed from a ground surface.

Preferably the base support comprises a generally convex lower surface.

The lower surface could be discontinuous or have straights parts, but still provide a convex general shape to allow rocking of the base.

The base support may comprise a heel portion.

The heel portion preferably comprises a lower surface which is the lowermost part of the device.

The lower surface of the base support preferably curves upwardly from the heel to a front end of the base support.

The lower surface of the base support preferably acts as a rocking surface which enables the weed engaging portion to move in an upward direction when the handle portion is tilted backward.

Preferably the lower surface of the base support is able to slide forward and up when pressure is applied by a foot to the foot portion and a handle connected to the handle portion is moved backward.

The foot portion may comprise a rear wall of the device.

The rear wall may be located above the heel portion.

It is preferred that the rear wall extends at an angle upwardly with respect to the heel portion.

The rear wall may extend forward with respect to the heel portion.

The rear wall may extend forward to a rear portion of the handle portion.

It is preferred that the rear wall comprises a forwardly sloping surface.

The rear wall may comprise a flat surface located behind the handle portion.

The rear wall preferably is located in front of the rear most part of the heel portion.

Preferably the handle portion includes an upwardly extending tubular section with an open upper end adapted to receive a pole.

The handle portion preferably extends rearwardly of the weed engaging portion.

The handle portion preferably extends rearwarldy at substantially 45° with respect to a horizontal plane when the heel portion is resting on a flat surface.

The handle portion may be located behind an approximate mid point of the base support.

The device preferably comprises a body portion which is located between the weed engaging portion and the handle portion.

The body portion may have a substantially smooth upper surface.

It is preferred that the body portion has a slightly curved upper surface which curved surface is concave.

Preferably the weed engaging portion has a substantially smooth upper surface which extends into the upper surface of the body portion.

The forwardly projecting portions are preferably substantially flat.

The forwardly projecting portions may have inner converging surfaces.

The forwardly projecting portions may be in the form of cutting teeth.

The inner edges of the forwardly projecting portions preferably act as blades.

The inner edges may curve upwardly towards their outermost ends.

It is preferred that the inner edges when viewed from above comprise a straight section and terminate in a pointed section.

The body portion preferably includes a shovel surface which is able to collect soil thereon.

The body portion may have side surfaces.

The side surfaces may curve upwardly or may be angled upwardly.

It is preferred that the body portion has upwardly turned side edges.

The upwardly turned side edges preferably form vertical walls.

The body portion preferably includes an open front face which allows entry of soil when the device is driven by a foot through soil.

The front edges preferably extend laterally substantially perpendicular to the forwardly projecting portions.

It is preferred that the side surfaces decrease in width to the rear of the body portion.

It is preferred that the side surfaces converge rearwardly to the handle portion.

A preferred embodiment of the present invention will now be described by way of example only with reference to the accompanying drawings in which.

Figure 1:
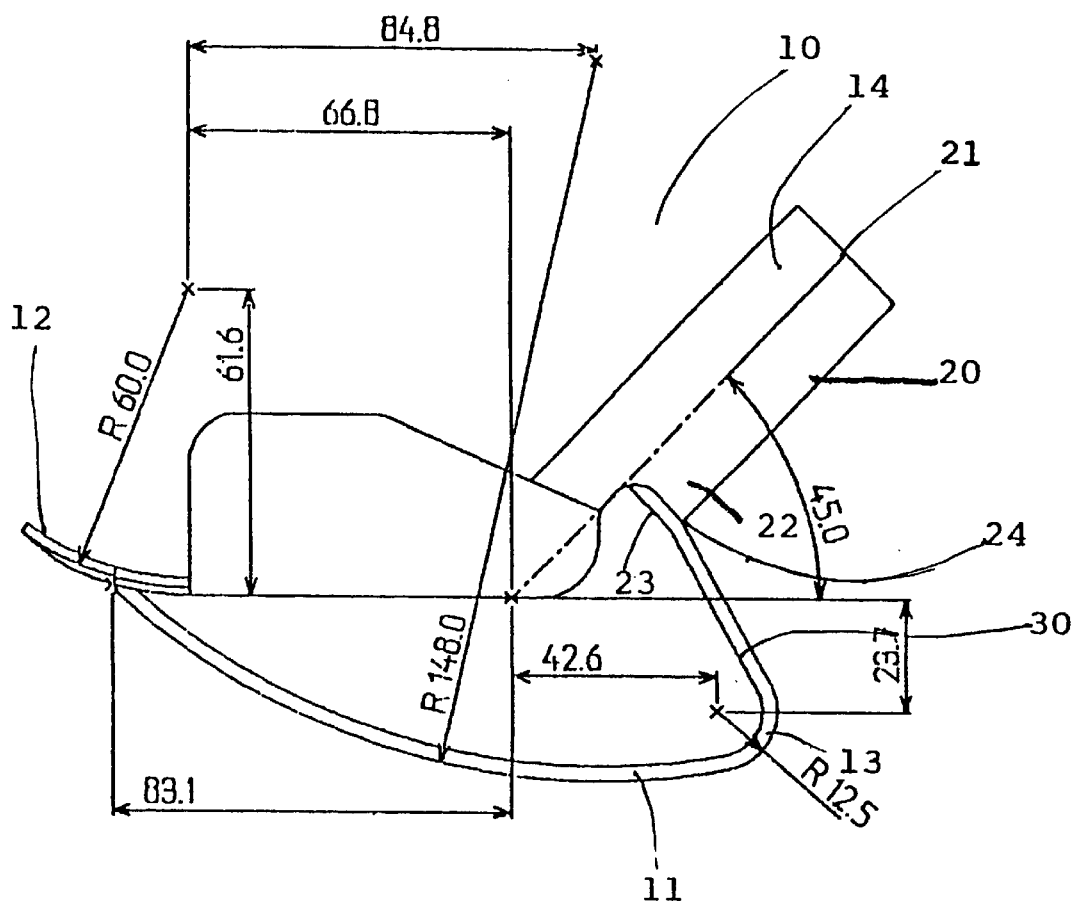
FIG. 1 shows a side view of a gardening implement according to the preferred embodiment.
Figure 2:
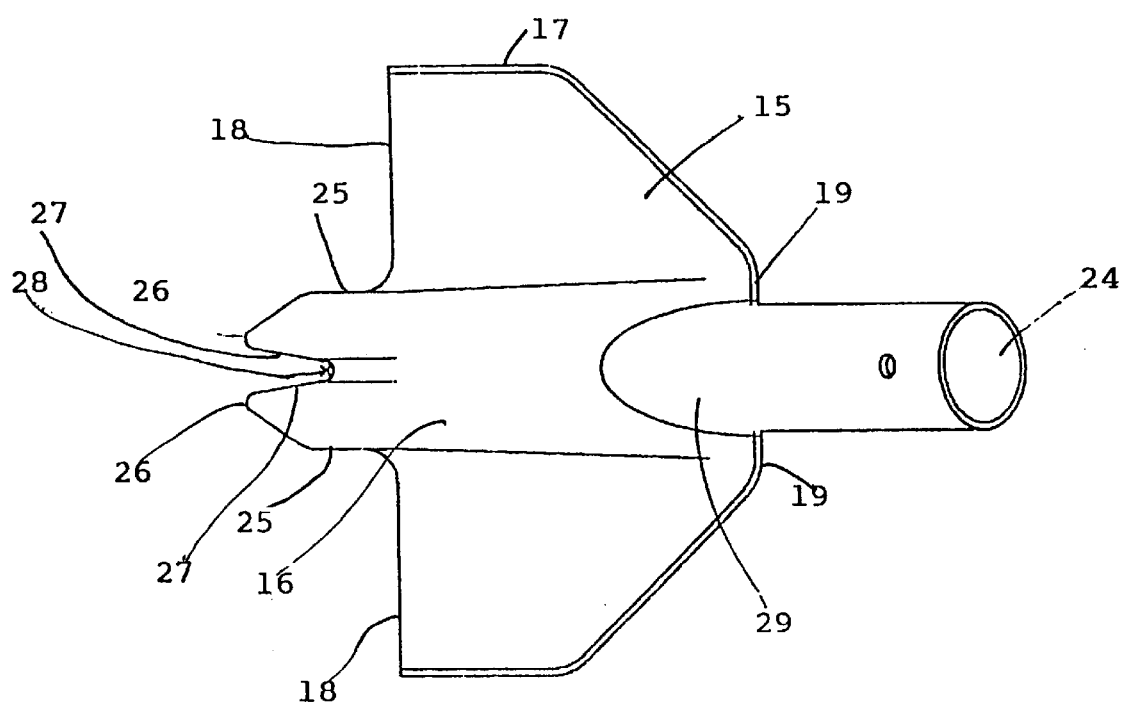
FIG. 2 shows a top view of the gardening implement shown in FIG. 1.
Figure 3:
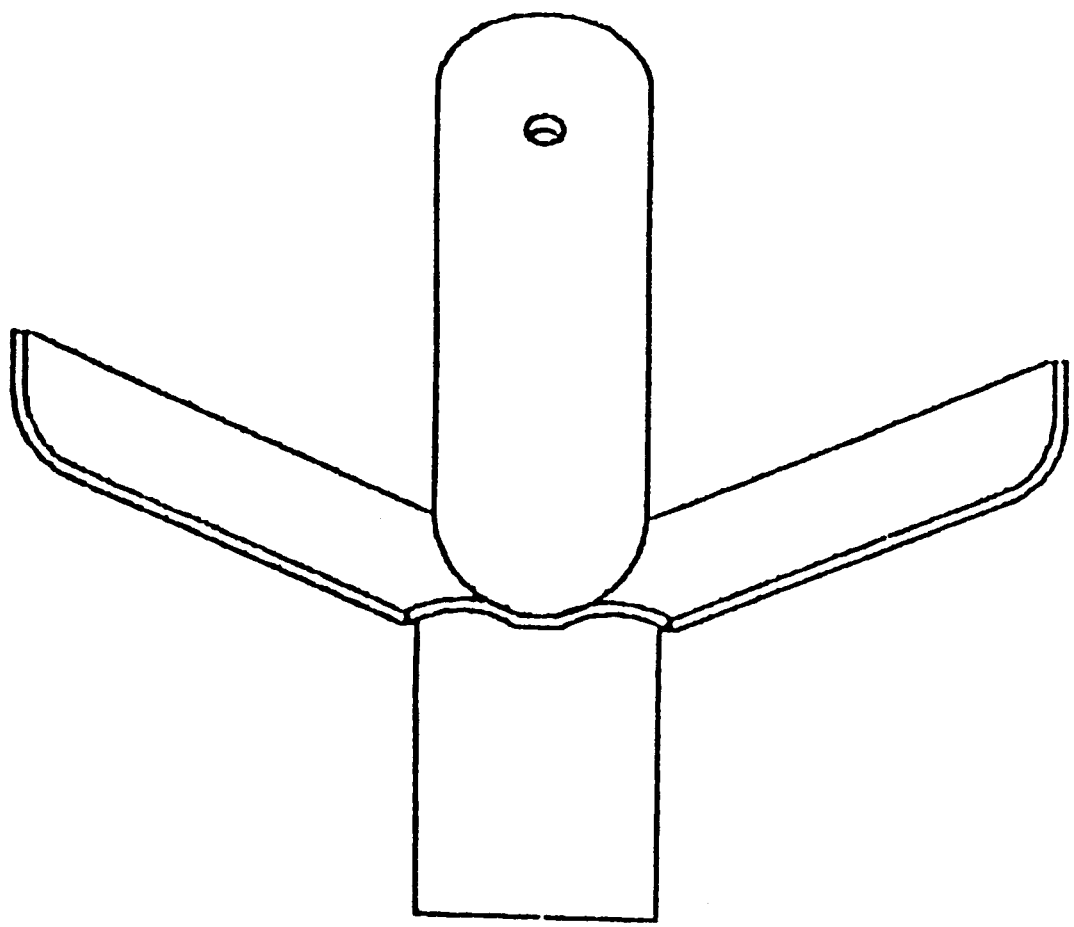
FIG. 3 shows a front view of the gardening implement shown in FIG. 1.

The gardening implement 10 consists of an upwardly curved foot 11 which at its front end extends into two weed engaging prongs 12 and rearwardly forms a heel 13 which is connected behind a tubular spigot 14 which is adapted to receive a wooden pole to thereby act as a handle.

The spigot 14 extends upwardly at an angle of 450 with respect to a horizontal plane drawn through the implement when its heel is resting on a flat surface. This spigot 14 extends forwardly into a shovel portion 15 consisting of a central area 16 which extends forward to the prongs 12. On either side of the central area 16 the shovel 15 extends upwardly at a slight angle and is provided with upwardly extending peripheral walls 17 which extend from the outermost regions of front edges to the rearmost edges 19 which terminate at respective sides of the spigot 14.

The spigot 14 at its upper end 20 is effectively a tubular cylinder with an open end 21. At its lower end it consists of a front section 29 which extends into the shovel central area 16 and a rearward surface 22 which terminates abruptly where an uppermost part 23 of heel 13 is connected thereto and closes off the bottom of the shaft 24 of the spigot 14. The front section 29 is therefore a curved planar element which extends below the generally cylindrical spigot past and above end 23 of heel 13.

The foot 11 is made from a planar strip of metal which may be hardened steel. This strip is approximately 30 cm wide and is welded underneath the prongs 12 and forms a convex curved sole which extends to the rearmost point of heel 13 and then curves upwardly and forwardly at a slight angle to the spigot 14 and has its end rounded so that it blocks the end of the passage 24. A weld is preferably provided between the back of the spigot 22 at its lowermost part to the adjoining part of the foot 11.

The heel 13 preferably extends upwardly at an angle of around 30° with respect to a vertical axis.

The prongs 12 extend in front of the front edges 18 of the shovel 15. The prongs consist of an initially straight section 25 and then converge to a point 26. The inner edges of the prongs 27 converge inwardly and meet at point 28. The edges of the prongs are preferably thin enough to allow the prongs to pass easily through soil. They may also be slightly curved from the outer edge 25 to the inner edge 27.

The device 10 is used by placing it behind a weed and placing a foot on the forwardly extending part of the heel 30. The prongs 12 are dipped below the weed and into the ground as the person holds the handle connected to spigot 14. This is possible because the device is able to rock on the sole of the foot 11. The prongs are then able to be brought up underneath the weed so that the weed is captured between them by rocking the foot backwards using the handle 14 and if necessary still applying pressure to section 30 of heel 13. The weed is then captured between the prongs 12 and soil can be collected on the shovel 15 behind them.

According to other variations of the above described device a weeding implement is made which does not include a shovel 15. Furthermore additional variations may be made to the foot design but still enable the same type of action to remove a weed. For example the whole foot and heel could be replaced by a downwardly extending member which has a separate heel and foot section with the device still able to pivot or rock on the foot and pressure still being able to be applied to the heel although it may have a different configuration.

What is claimed is:

1. A gardening device comprising a weed engaging portion having forwardly projecting portions with a gap therebetween, a foot portion adapted to receive pressure applied by a foot, a rocking base support for supporting the gardening device on a ground surface; the rocking base support including a generally convex ground engaging lower surface and a handle portion connectable to an elongate handle; and wherein pressure applied to the foot portion is operative to move the weed engaging portion forward to engage a weed while the handle connected to the handle portion is operative to rock the ground engaging lower surface on the ground which results in the weed engaging portion being pivoted upwardly with respect to the ground surface to remove the weed from the ground surface.

2. The gardening device as claimed in claim 1 wherein the base support includes a heel portion.

3. The gardening device as claimed in claim 2 wherein the heel portion includes a lower surface which is a lowermost part of the device.

4. The gardening device as claimed in claim 3 wherein the lower surface of the base support curves upwardly from the heel portion to a front end of the base support.

5. The gardening device as claimed in claim 4 wherein the lower surface of the base support acts as a rocking surface which enables the weed engaging portion to move in an upward direction when the handle portion is tilted backwards.

6. The gardening device as claimed in claim 5 wherein the lower surface of the base support is able to slide forward and up when pressure is applied by the foot to the foot portion and a handle connected to the handle portion is moved backwards.

7. The gardening device as claimed in claim 6 wherien the foot portion include a rear wall of the device.

8. The gardening device as claimed in claim 7 wherein the rear wall is located above the heel portion.

9. The gardening device as claimed in claim 8 wherein the rear wall extends at an angle upwardly with respect to the heel portion.

10. The gardening device as claimed in claim 9 wherein the rear wall extends forward with respect to the heel portion.

11. The gardening device as claimed in claim 10 wherein the rear wall extends forward to a rear portion of the handle portion.

12. The gardening device as claimed in claim 11 wherein the rear wall includes a forward sloping surface.

13. The gardening device as claimed in claim 12 wherein the rear wall comprises a flat surface located behind the handle portion.

14. The gardening device as claimed in claim 13 wherein the rear wall is located in front of a rearmost part of the heel portion.

15. The gardening device as claimed in any one of the preceding claims wherein the handle portion includes an upwardly extending tubular section with an open upper end adapted to receive a pole.

16. The gardening device as claimed in claim 15 wherein the handle portion extends rearwardly of the weed engaging portion.

17. The gardening device as claimed in claim 16 wherein the handle portion extends rearwardly at substantially 45° with respect to a horizontal plane when the foot portion is resting on a flat surface.

18. The gardening device as claimed in claim 17 wherein the handle portion is located behind an approximate midpoint of the base support.

19. The gardening device as claimed in claim 1 further comprising a body portion which is located between the weed engaging portion and the handle portion with the body portion having an upper surface adapted to carry soil.

20. The gardening device as claimed in claim 19 wherein the body portion has a slightly concave upper surface.

21. The gardening device as claimed in claim 20 wherein the body portion includes a shovel surface.

22. The gardening device as claimed in claim 21 wherein the body portion includes side surfaces which curve upwardly.

23. The gardening device as claimed in claim 22 wherein the body portion has an open front face which allows entry of soil when the device is driven by a foot through soil.

24. The gardening device of claim 1 wherein the base support also forms a shovel including an upper surface that is generally concave shaped from front to rear and from side to side.

* * * * *